United States Patent
Xue et al.

(10) Patent No.: US 9,438,826 B2
(45) Date of Patent: Sep. 6, 2016

(54) PIXEL STRUCTURE AND RESET SCHEME

(71) Applicant: Rambus Inc., Sunnyvale, CA (US)

(72) Inventors: Song Xue, San Jose, CA (US); Thomas Vogelsang, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 246 days.

(21) Appl. No.: 14/135,014

(22) Filed: Dec. 19, 2013

(65) Prior Publication Data

US 2014/0175264 A1    Jun. 26, 2014

Related U.S. Application Data

(60) Provisional application No. 61/740,306, filed on Dec. 20, 2012, provisional application No. 61/794,498, filed on Mar. 15, 2013.

(51) Int. Cl.
| | |
|---|---|
| *H01L 27/146* | (2006.01) |
| *H04N 5/335* | (2011.01) |
| *H04N 5/347* | (2011.01) |
| *H04N 5/357* | (2011.01) |
| *H04N 5/3745* | (2011.01) |
| *H04N 5/378* | (2011.01) |

(52) U.S. Cl.
CPC .............. *H04N 5/335* (2013.01); *H04N 5/347* (2013.01); *H04N 5/3575* (2013.01); *H04N 5/378* (2013.01); *H04N 5/37457* (2013.01)

(58) Field of Classification Search
CPC .................. H01L 27/14612; H01L 27/14614; H01L 27/14654; H01L 27/14689
USPC ....................................... 250/208.1
See application file for complete search history.

(56) References Cited

U.S. PATENT DOCUMENTS

| | | | | |
|---|---|---|---|---|
| 6,921,934 B2* | 7/2005 | Patrick | .............. | H01L 27/14603 257/291 |
| 8,575,531 B2* | 11/2013 | Hynecek | .............. | H01L 27/1464 250/208.1 |
| 2004/0262622 A1* | 12/2004 | Patrick | .............. | H01L 27/14603 257/79 |
| 2005/0001143 A1* | 1/2005 | Rhodes | .............. | H01L 27/14627 250/208.1 |
| 2011/0025893 A1 | 2/2011 | Kim et al. | | |
| 2011/0192959 A1 | 8/2011 | Hynecek | | |

OTHER PUBLICATIONS

Ignjatovic et al., "Low Power, High Dynamic Range CMOS Image Sensor Employing Pixel-Level Oversampling Sigma Delta Analog-to-Digital Conversion," IEEE Sensors Journal, vol. 12, No. 4, pp. 737-746, Apr. 2012. 10 pages.
Kavusi et al., "Quantitative Study of High Dynamic Range Image Sensor Architectures," Proc. of SPIE—IS&T Electronic Imaging 2004, SPIE vol. 5301, pp. 264-275, Jan. 2004. 12 pages.
Ma, Cheng, "Pixel ADC Design for Hybrid CMOS Image Sensors," Thesis for a Master of Science in Electrical Engineering submitted to Delft University of Technology, Aug. 2010. 97 pages.

* cited by examiner

*Primary Examiner* — Seung C Sohn
(74) *Attorney, Agent, or Firm* — Fenwick & West LLP

(57) ABSTRACT

An image sensor that includes a pixel array with image pixels with conditional reset circuitry. The pixels can be reset by a combination of row select and column reset signals, which implements the reset function while minimizing the number of extra signal lines. The pixels may also include pinned photodiodes. The manner in which the pinned photodiodes are used reduces noise and allows the quantization of the pixel circuits to be programmable.

20 Claims, 16 Drawing Sheets

| | ROWSEL Signal Status | COLRST Signal Status |
|---|---|---|
| Global Reset | All ROWSEL signals asserted | All COLRST signals asserted |
| Single Row Reset | Single ROWSEL signal asserted | All COLRST signals asserted |
| Single Column Reset | All ROWSEL signals asserted | Single COLRST signal asserted |
| Single Pixel Reset | Single ROWSEL signal asserted | Single COLRST signal asserted |
| Single Row Read | Single ROWSEL signal asserted | No COLRST signals asserted |
| Exposure | No ROWSEL signals asserted | No COLRST signals asserted |

FIG. 2

PIXEL STRUCTURE AND RESET SCHEME

CROSS REFERENCE TO RELATED APPLICATIONS

This application claims priority from U.S. Provisional Application No. 61/740,306 entitled "Pixel Structure and Reset Scheme" and filed on Dec. 20, 2012, the contents of which are incorporated by reference herein in their entirety. This application also claims priority from U.S. Provisional Application No. 61/794,498 entitled "Pixel Structure and Reset Scheme" and filed on Mar. 15, 2013, the contents of which are incorporated by reference herein in their entirety.

TECHNICAL FIELD

The present disclosure relates to electronic image sensors, and more specifically to binary pixel and multibit pixel conditional-reset image sensors.

BACKGROUND

An image sensor is a device that converts light into electronic signals for producing an image. One specific type of image sensor is the binary pixel image sensor that uses binary circuits to convert detected light into binary logic values. Binary pixel image sensors can offer improved dynamic range over conventional analog image sensors. However, binary pixel image sensors can include a large number of binary pixel circuits that can require more signal routing to implement. Additionally, binary image sensors, like traditional analog image sensors, can be susceptible to random device noise and fixed pattern noise caused by mismatches across the pixels, which can affect the quality of an image produced by the binary pixel image sensor.

BRIEF DESCRIPTION OF THE DRAWINGS

The teachings of the embodiments herein can be readily understood by considering the following detailed description in conjunction with the accompanying drawings.

FIG. 2 is a chart of different reset schemes for the image sensor of FIG. 1, according to an embodiment.

DETAILED DESCRIPTION OF EMBODIMENTS

Embodiments of the present disclosure relate to a binary pixel image sensor and a multibit image sensor with conditional pixel reset. The image sensors can include a pixel array with image pixels comprised of one or more binary pixels or multibit pixels (pixels in sensors that quantize an analog signal output by a pixel with more than a single bit or resolution). In one embodiment, the pixels can be reset with a combination of row select and column reset signals, which implements the reset function while reducing or minimizing the number of extra signal lines. In another embodiment, the pixels include pinned photodiodes. The manner in which the pinned photodiodes are used reduces noise and allows the quantization of the pixel conditional reset circuits to be programmable.

Reference is now made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

Reset Scheme for Pixel Circuits

In one embodiment, an image sensor comprises row lines and column lines. A control circuit generates row signals for the row lines and column reset signals for the column lines. An array of pixel circuits is also coupled to the row lines and column lines. Each pixel circuit comprises a photodetecting section to convert light into charge carriers and a signal node coupled to the photodetection section. A reset element is coupled to the signal node to selectively reset the signal node. A row-enabled switch is configured to pass or not pass, depending on a state of a corresponding row signal, a corresponding column reset signal to the reset element that, when asserted, causes the reset element to reset the signal node.

Figure 1:
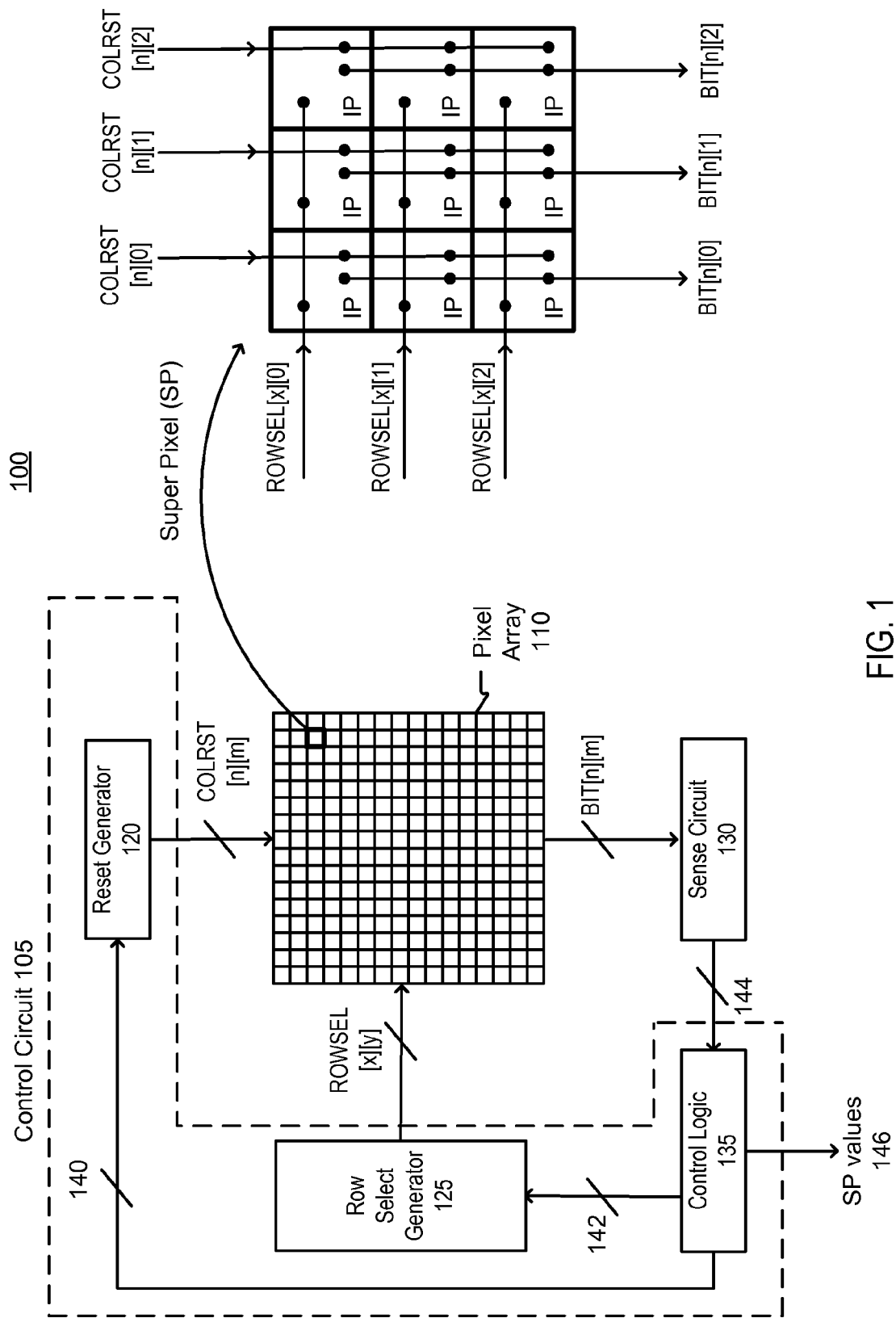
FIG. 1 is a diagram of an image sensor, according to an embodiment.

FIG. 1 is a diagram of an image sensor 100, according to an embodiment. The image sensor 100 includes a control circuit 105, a pixel array 110 and sense circuitry 130. The pixel array can be divided into multiple pixel regions referred to herein as super pixels (SP). Each SP represents a group of imager pixels that all contribute to a single pixel of an image produced by the image sensor 100 and is akin to a single imager pixel of a conventional analog image sensor. Each SP is formed by a cluster of one or more imager pixel circuits (also referred to as imager pixels or IPs). When the pixel array 110 is exposed to light, the light interacts with silicon to generate electron-hole pairs. An electric field in the region of each IP causes the generated electron and hole to separate, with one or the other being collected within that IP. Each IP, when addressed, outputs a corresponding analog voltage representing an amount of light incident on the IP, as indicated by the charge carriers collected in the IP.

The SPs and the IPs are organized into rows and columns. There are [x] rows and [n] columns of SPs. Each SP includes [y] rows and [m] columns of IPs (where either or both y and m could be 1 in certain embodiments). Thus, there are a total of [x][y] rows of IPs and [n][m] columns of IPs. A row may refer to either a physical row of pixels or a logical row of pixels. For example, a physical row of IPs can be subdivided into two logical rows of IPs (for instance interleaved rows), where each logical row is connected to a different ROWSEL line. Similarly, a column may refer to either a physical column of pixels or a logical column of pixels. In one embodiment, rows are oriented horizontally and columns are oriented vertically such that the columns are perpendicular to the rows.

In this embodiment, sense circuitry 130 receives, via the column bit (BIT) lines, analog voltages from the pixel array 110. Each analog voltage represents an amount of light incident at a single IP. The sense circuitry 130 senses the output signals of the IPs via the BIT lines. Each BIT line is connected to multiple IPs in one or more columns of the pixel array 110, but the sense circuitry 130 senses the IP coupled to that BIT line and that is selected by the ROWSEL signal. For each IP, the sense circuitry 130 uses the analog voltage level of the IP output signal to determine whether the light incident on the IP exceeds a threshold amount of light. For each IP, the sense circuitry 130 outputs a single-bit binary signal 144 that indicates whether a threshold number of charge carriers have been collected by that IP since the IP was last reset. For example, a sense amplifier 130 outputting a binary signal 144 having a digital value of "0" can indicate that the threshold amount of light has not yet been detected, and a sense amplifier 130 outputting a binary signal 144 having a digital value of "1" can indicate that the threshold amount of light has been detected. The binary signals 144 are transmitted to the control circuit 105. In other embodiments, the sense circuitry 130 performs an analog to digital conversion (ADC) of each analog BIT signal and outputs multi-bit digital signals 144 representing the value of each BIT signal.

In a binary pixel circuit, the threshold crossing determination is used as both image information and as a signal to enable a pixel reset. In a multibit embodiment, the threshold crossing can be used to enable a pixel reset, to cause an ADC conversion of the analog signal to a digital signal, to cause the ADC digital signal to be stored or accumulated, and/or all of these.

In an alternate embodiment, the sense circuitry 130 is implemented partially or entirely internal to the pixel array 110, and digital signal lines 144 are the column output signal lines exiting the pixel array 110. In FIG. 1, the sense circuitry 130 is shown as external to the pixel array 110 to more clearly illustrate the functionality, but this is not required. In still another alternate embodiment, the sense circuitry 130 is located on a companion integrated circuit (IC) mated to the IC containing the pixel array 110, with analog pixel signals transferred between the two ICs.

The control circuit 105 controls the pixel array 110 via the row select (ROWSEL) lines and column reset (COLRST) lines. As shown, the control circuit 105 includes several components, such as a reset generator 120, a row select generator 125, and control logic 135.

The reset generator 120 generates column reset signals for resetting the internal state of the IPs. The column reset signals are transmitted to the pixel array 110 via the COLRST lines. Each COLRST line is connected to multiple IPs in one or more columns of the pixel array 110. As used herein, a COLRST signal refers to a column reset signal of a COLRST line.

The row select generator 125 generates row select signals that select a row (or one or more partial rows) of IPs for readout. The row select signals are transmitted to the pixel array 110 via the horizontal ROWSEL lines. Each ROWSEL line is connected to multiple IPs in one or more rows of the pixel array 110. As used herein, a ROWSEL signal refers to a row select signal on the ROWSEL line.

The control logic 135 controls the timing of the COLRST signals output by the reset generator 120 via internal control signals 140. The control logic 135 controls the timing of the ROWSEL signals output by the row select generator 125 via internal control signals 142. The control logic also receives binary signals 144 from the sense circuitry 130 representing, for each IP in a column, whether a threshold amount of light has been detected by the IP. For each SP, the control logic 135 can combine the binary signals 144 for the individual IPs of the SP to create SP image values 146 that represent an amount of light incident at the SPs, or the control logic 135 can transmit raw or partially combined binary signals off-chip for storage and/or processing. In other embodiments, the control logic 135 can also perform the same operations for multi-bit digital signals 144.

In one embodiment, after being reset, the IPs accumulate charge carriers during an exposure phase. During a readout phase, the control circuit 105 and sense circuit 130 read out the voltages from, e.g., one row of IPs at a time. Each selected IP can be reset when its corresponding binary signal 144 indicate that the IP has been exposed to a threshold amount of light (i.e. threshold number of charge carriers has accumulated). Alternatively, the IPs can be reset after a fixed amount of time has elapsed or reset at other times.

As shown in FIG. 1, the ROWSEL lines and COLRST lines form a grid such that each IP is connected to both a ROWSEL line and a COLRST line. In one embodiment, an IP is only reset if both the ROWSEL signal and the COLRST signal connected to the IP are asserted. In any other situation, the IP is not reset. Because each intersection of COLRST and ROWSEL lines is connected to a different IP, the control circuit 105 can individually reset one IP at a time. Alternatively, the control circuit 105 can reset one row of IPs at a time, one column of IPs at a time, any combination of multiple IPs served by the same COLRST line or the same ROWSEL line, contiguous or non-contiguous blocks of IPs served by the same set of COLRST and ROWSEL lines, or reset the entire pixel array 110 at once. Beneficially, resetting an IP of an image sensor 100 with a combination of a ROWSEL line and a COLRST line enables different types of reset schemes without needing to add a dedicated reset signal for each IP.

FIG. 2 is a chart of different reset modes for the image sensor of FIG. 1, according to an embodiment. The chart shows that, by using the grid-like configuration of horizontal ROWSEL and vertical COLRST lines from FIG. 1, the image sensor 100 can support multiple different types of reset functions.

To perform a global reset, the control circuit 105 concurrently asserts all of the ROWSEL signals and all of the COLRST signals in the image sensor 100. Performing the global reset resets all of the IPs in the pixel array 110.

To reset a single row of IPs, the control circuit 105 asserts a single ROWSEL signal that is connected to the row of IPs. The control circuit 105 also asserts all of the COLRST signals in the image sensor 100. A partial reset of the row can also be performed by resetting a subset of the COLRST signals.

To reset a single column of IPs, the control circuit 105 concurrently asserts all of the ROWSEL signals in the image sensor 100. The control circuit 105 also asserts a single COLRST signal that is connected to the column of IPs. A partial reset of the column can also be performed by resetting a subset of the ROWSEL signals.

To reset a single IP, the control circuit 105 asserts a single ROWSEL signal that is connected to the IP. The control circuit 105 also asserts a single COLRST signal that is connected to the IP.

When reading the output signals from a single IP row, the control circuit 105 asserts a single ROWSEL signal that is connected to the IP row. None of the COLRST signals in the image sensor 100 are asserted during a readout phase to prevent the IPs in the row from being inadvertently reset during the readout.

During the exposure phase, the IPs are exposed to light and should not be reset. To prevent the IPs in the exposure phase from being reset, none of the ROWSEL signals or COLRST signal combinations in the image sensor 100 that address pixels in the exposure phase are concurrently asserted.

Figure 3:
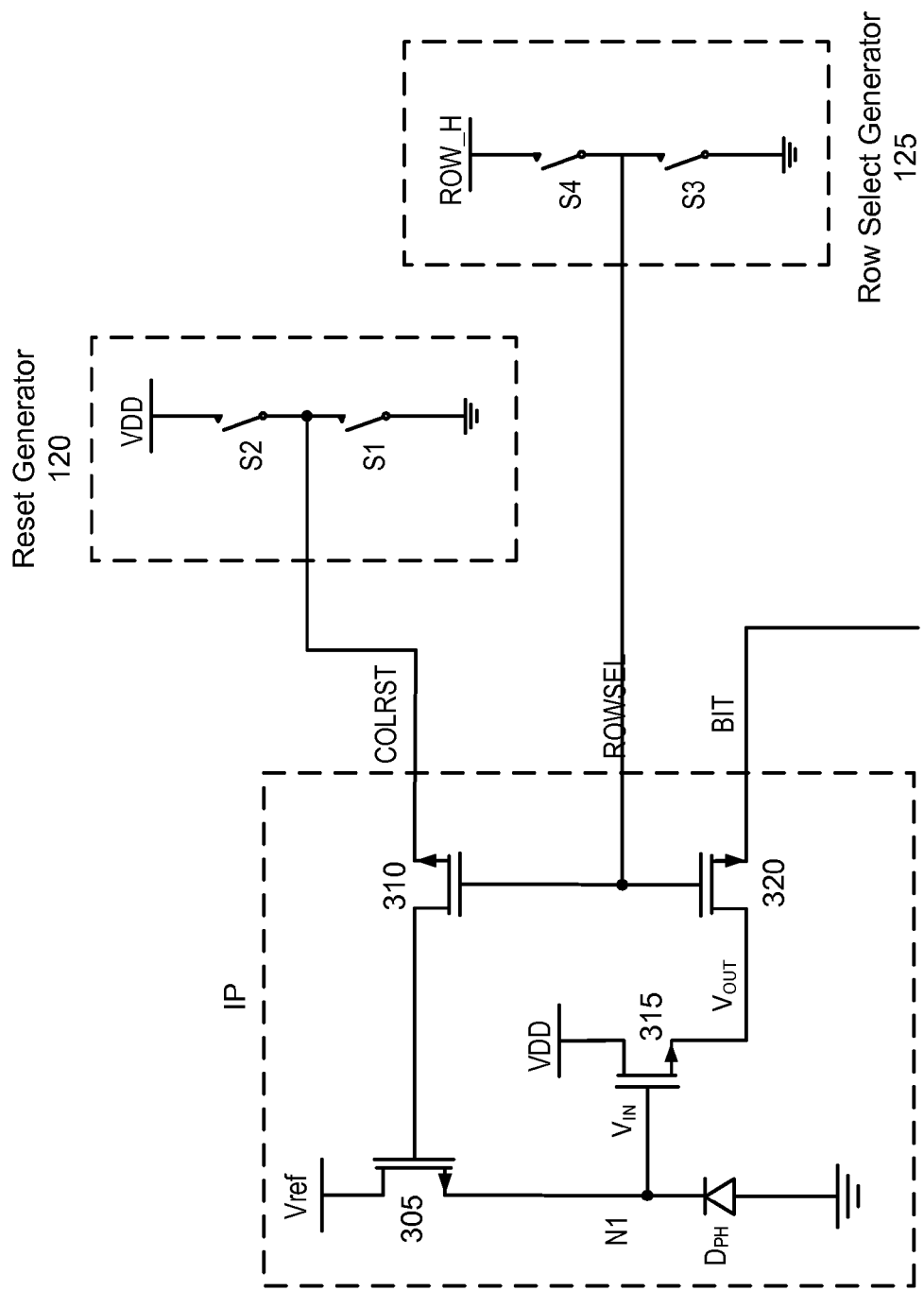
FIG. 3 is a circuit diagram of a single pixel that shows row enabled reset, useful, e.g., with the sensor of FIG. 1 and the reset schemes of FIG. 2, in more detail, according to an embodiment.

FIG. 3 is a circuit diagram of a single pixel (IP) that supports row enabled reset, according to an embodiment. The pixel IP includes a photodiode $D_{PH}$, a source follower output stage 315, an access switch 320, a reset switch 305 and a reset gating switch 310. In one embodiment, the output stage 315, access switch 320, reset switch 305 and reset gating switch 310 are implemented with NMOS or PMOS transistors.

The photodiode $D_{PH}$ is a type of photodetector that converts light into charge and forms the photodetecting section of the IP. The cathode terminal of the photodiode $D_{PH}$ is coupled to the input of the source follower 315 at signal node N1. The anode terminal of the photodiode $D_{PH}$ is coupled to ground. The photodiode $D_{PH}$ is operated in reverse-bias such that the cathode voltage is higher than the anode voltage. When exposed to light, photons absorbed by the silicon in or near the photodiode $D_{PH}$ can cause the photodiode $D_{PH}$ to collect charge carriers (e.g. electrons or holes). As a result, the voltage at the cathode of the photodiode $D_{PH}$ is adjusted (i.e. decreased or increased) according to the amount of light incident on the photodiode $D_{PH}$.

The reset switch 305 is coupled between a reference voltage Vref and the photodiode $D_{PH}$. When the reset switch 305 is closed, the voltage across the photodiode $D_{PH}$ is reset to the reference voltage level Vref, thereby resetting signal node N1 and the state of the IP. When the reset switch 305 is open, the voltage across the photodiode $D_{PH}$ is allowed to change as light incident on the photodiode $D_{PH}$ causes charge carriers to be collected.

Reset gating switch 310 is coupled between the COLRST line and the gate of the reset switch 305. When the ROWSEL signal is de-asserted, reset gating switch 310 is opened to float the gate of the reset switch 305. This blocks the COLRST signal from affecting switch 305, which prevents the IP from being reset. On the other hand, when the ROWSEL signal is asserted, reset gating switch 310 is closed to pass the COLRST signal to the gate of the reset switch 305. Passing the COLRST signal enables the COLRST signal to be used in controlling the opening and closing of the reset switch 305, thus also controlling the resetting of the IP.

Reset gating switch 310 thus functions as a pass transistor that allows the IP to be reset under the control of both a COLRST signal and a ROWSEL signal. In other words, switch 310 functions as a row-enabled switch (i.e., controlled by ROWSEL signal) that either passes or does not pass the COLRST signal, thus controlling the reset element 305 of the IP. If both COLRST and ROWSEL are asserted, reset switch 305 is activated to reset the voltage across the photodiode $D_{PH}$. In any other situation, reset switch 305 is off and the voltage across the photodiode $D_{PH}$ is allowed to change. As a result, the IP of FIG. 3 can be used to implement the reset schemes of FIG. 2.

The drain of the output stage 315 is coupled to a power source VDD and the gate of the output stage 315 is coupled to the photodiode $D_{PH}$. The output stage is configured as a source follower such that the gate of the output stage 315 functions as the input of the output stage 315 and the source of the output stage 315 functions as the output of the output stage 315. The output stage 315 receives an input signal $V_{IN}$ that is equivalent to the voltage across the photodiode $D_{PH}$ (and the voltage at signal node N1). The output stage 315 then generates an analog output signal $V_{OUT}$ that varies according to the input signal $V_{IN}$ and varies with the amount of charge collected at the photodiode $D_{PH}$. The output stage 315 also buffers the photodiode $D_{PH}$ from the BIT line so that the IP can be repeatedly read without affecting the charge carriers present at the photodiode $D_{PH}$.

The access switch 320 is coupled between the output stage 315 and the BIT line and is used to select the IP for readout. When the ROWSEL signal is asserted, the access switch 320 is closed and the output signal $V_{OUT}$ is passed onto the BIT line where it can be read. When the ROWSEL signal is de-asserted, the access switch 320 is open and the output signal $V_{OUT}$ is decoupled from the BIT line.

FIG. 3 also includes a more detailed view of a reset generator 120 and a row select generator 125, according to an embodiment. Reset generator 120 can include, for example, two switches S1 and S2. Switches S1 and S2 are opened and closed to assert and de-assert the COLRST signal. Row select generator 125 can also include, for example, two switches S3 and S4 that can be opened and closed to assert and de-assert the ROWSEL signal. Preferably, switch S4 couples a voltage ROW_H, which is at least a transistor threshold higher than voltage VDD, to ROWSEL. Each COLRST signal and ROWSEL signal may be generated with a different set of switches so that all of the reset modes in FIG. 2 can be implemented. The switches (e.g. S1, S2) within each reset generator 120 can be controlled by several inputs, including global selects (that turn all reset generators 120 off or on) and COLRST-specific inputs based on a threshold comparison performed by sense circuits 130 (FIG. 1).

Pixel Circuit with Pinned Photodiode

In one embodiment, the integrated-circuit image sensor comprises an array of pixel circuits. Each pixel circuit includes a photodetector (for example in the form of a pinned photodiode), a signal node (e.g., floating diffusion), a transfer gate to transfer charge carriers between the photodetector and the floating diffusion responsive to a charge transfer signal, and a gain amplifier section having an input coupled to the signal node. Alternately, the signal node and gain amplifier section can be shared by several photodetectors all coupled to the signal node via different transfer gates. The gain amplifier amplifies changes in a signal node voltage caused by the transferred charge carriers to generate changes in an output signal. The image sensor also includes a sense circuit section to generate, responsive to the output signal of the gain amplifier for each pixel circuit, a binary signal indicative of whether the photodetector has collected more than a threshold number of charge carriers.

Figure 4:
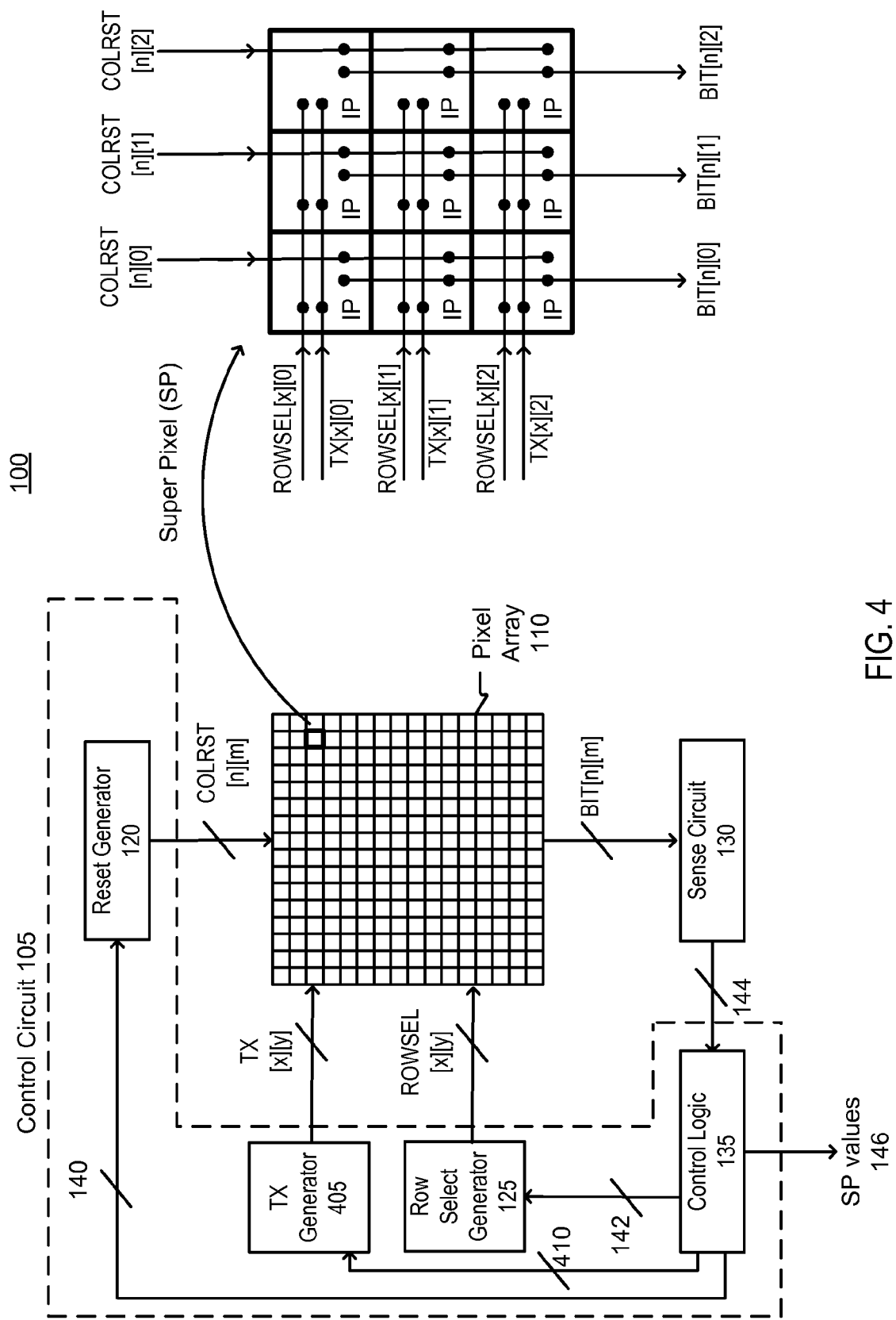
FIG. 4 is a diagram of an image sensor, according to another embodiment capable of using the reset schemes of FIG. 2.

FIG. 4 is circuit diagram of an image sensor 100, according to another embodiment. FIG. 4 is similar to FIG. 1, but now includes a charge transfer signal generator (TX generator) 405 coupled to the pixel array 110 through charge transfer (TX) lines.

The charge transfer signal generator 405 generates TX signals for controlling charge transfer within pinned photodiode structures (not shown) of the IPs. As used herein, TX signals refer to charge transfer signals carried by the TX lines. Each row of IPs is controlled by a different TX line, resulting in a total of [x][y] number of TX lines. Each TX signal controls an entire row (or partial row or rows) of IPs at a time. Control logic 135 controls the timing of the TX signals output by TX generator 405 through control path 410. Sense circuit 130 may also perform correlated double sampling on the BIT lines, as will be explained herein.

Figure 5:
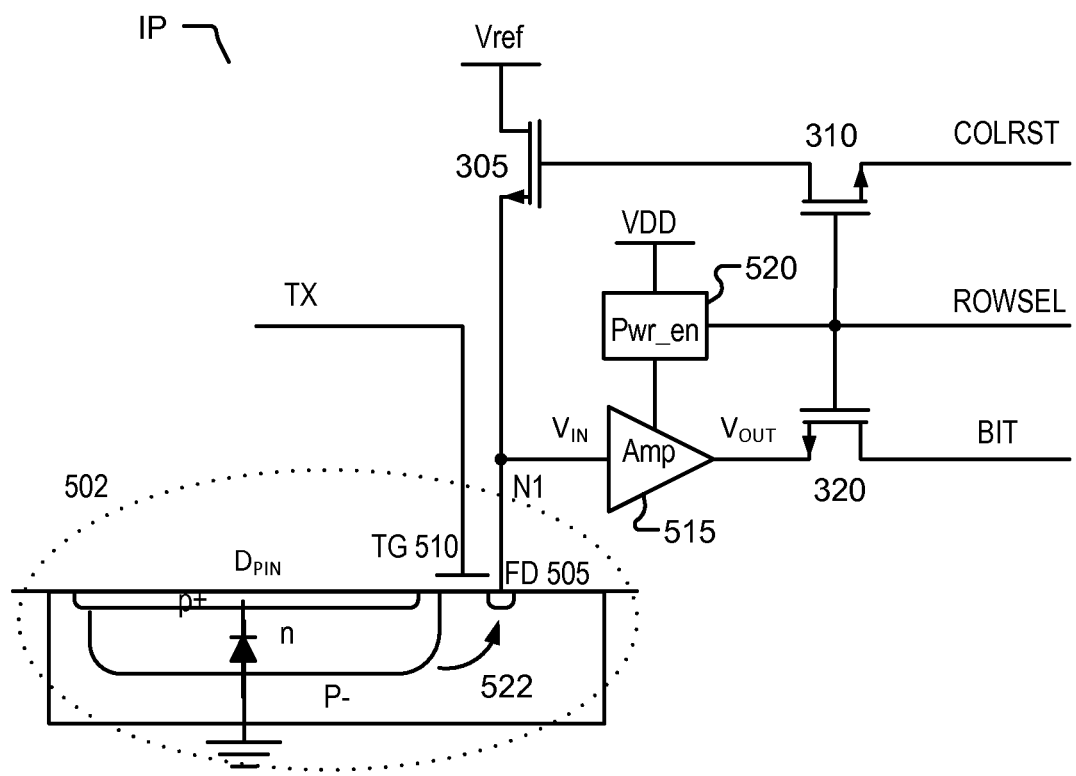
FIG. 5 is a circuit diagram of a pixel including a pinned photodiode structure that is suitable for use, e.g., as the pixels from FIG. 4, according to an embodiment.

FIG. 5 is a circuit diagram of a pixel IP that includes a pinned photodiode that is suitable for use as the pixel IP from FIG. 4, according to an embodiment. The arrangement and operation of the COLRST, ROWSEL and BIT lines as used to reset and readout information from the IP in FIG. 5 is similar to that shown in FIG. 3. However the photodetecting section of the pixel circuit IP is different. It now includes a pinned photodiode structure 502, as indicated by the dotted line. Additionally, the output stage is shown as an amplifier 515 (e.g. a gain amplifier) and power enable circuitry 520.

The pinned photodiode structure 502 includes a pinned photodiode $D_{PIN}$, a floating diffusion (FD) 505, and a charge transfer gate (TG) 510 coupled between the pinned photodiode $D_{PIN}$ and the floating diffusion 505. The pinned photodiode $D_{PIN}$ is a photodetector that includes P−, n, and p+ doped regions. When precharged and then exposed to light, charge carriers collect at the n-doped region of the pinned photodiode. The charge carriers are transferred 522 from the pinned photodiode $D_{PIN}$ to the floating diffusion 505 by pulsing the TX signal to close the charge transfer gate 510. Repeated pulses of the TX signal can cause charge carriers to accumulate at the floating diffusion 505 until the floating diffusion 505 is reset. The change in the charge carriers at the floating diffusion represents the amount of light incident on the pinned photodiode $D_{PIN}$.

The input of the amplifier 515 is coupled to the floating diffusion 505, which is also signal node N1. The amplifier 515 receives an input signal $V_{IN}$ having a voltage level that is representative of the amount of charge stored at the floating diffusion 505. Input signal $V_{IN}$ may also be referred to herein as the signal node voltage or floating diffusion voltage. Amplifier 515 can be configured as a source follower or as a gain amplifier. When configured as a gain amplifier, amplifier 515 amplifies voltage changes in the input signal $V_{IN}$ to generate amplified voltage changes in the output signal $V_{OUT}$. The gain amplifier 515 may have a high amount of gain so that even small amounts of change in the floating diffusion 505 charge (e.g. a single electron) can result in a measurable change in the output signal $V_{OUT}$.

The power enable circuitry 520 enables the amplifier 515 when the ROWSEL signal is asserted during readouts, and disables the amplifier 515 when the ROWSEL signal is de-asserted. When the amplifier 515 is enabled, it amplifies changes in the input signal $V_{IN}$ to generate an output signal $V_{OUT}$. When the amplifier 515 is disabled, $V_{OUT}$ may be floating or pulled to VDD to save power.

The access switch 320 passes the output signal $V_{OUT}$ onto the BIT line where it can be sampled by the sense circuit 130 (not shown in FIG. 5). In one embodiment, the sense circuitry 130 performs correlated double sampling of the output signal $V_{OUT}$ to precisely measure the change in voltage at the floating diffusion FD. The measured change is then compared to a threshold amount of change to determine if a threshold number of charge carriers has been collected by the pinned photodiode $D_{PIN}$. In other embodiments, the sense circuit 130 samples the output signal without using correlated double sampling and compares the sampled signal to a threshold level to determine if a threshold number of charge carriers has been collected.

Figure 6A:
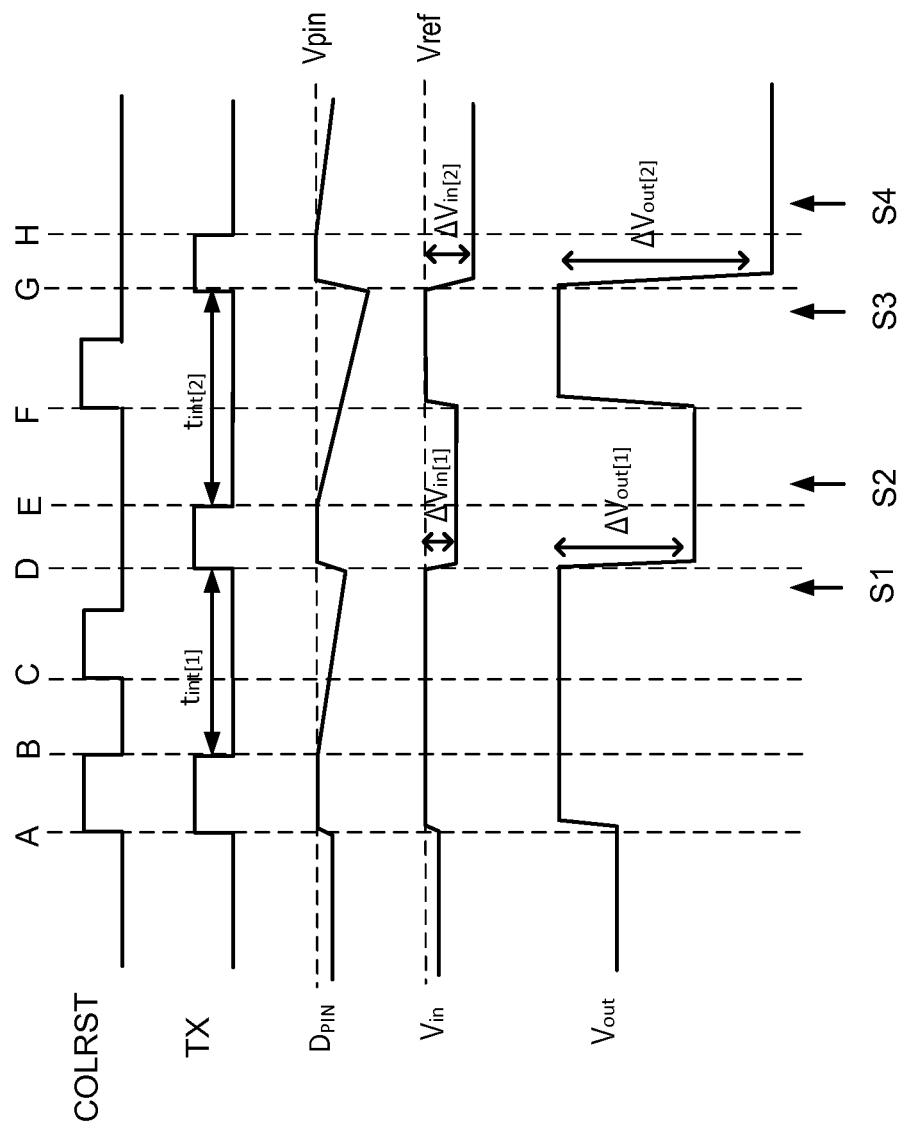
FIG. 6A is a timing diagram illustrating the operation of a pixel of FIG. 5 that uses correlated double sampling, according to an embodiment.

FIG. 6A is a timing diagram illustrating the operation of a pixel IP of FIG. 5 that uses correlated double sampling, according to an embodiment. For purposes of explanation, it is assumed that the ROWSEL signal to this IP is asserted at all relevant times. Additionally, the timing diagrams shown herein, such as those of FIGS. 6A, 6B, 12A and 12B may not be to scale and are shown only for understanding of embodiments described herein.

The initialization phase begins at time A and ends at time B. During initialization, the pinned photodiode structure 502 is reset by asserting both the COLRST and TX signals (recall that ROWSEL is assumed to be asserted for this entire example). This opens a path from Vref to the pinned photodiode $D_{PIN}$ and resets the input signal $V_{IN}$ at the floating diffusion FD to Vref. This also resets the voltage across the pinned photodiode $D_{PIN}$ to a pinned reset voltage level Vpin.

The exposure phase beings at time B and ends at time D. At time B, the pinned photodiode $V_{PIN}$ is disconnected from the floating diffusion FD. As the pinned photodiode $D_{PIN}$ is exposed to light, it collects charge carriers and the voltage across the pinned photodiode $D_{PIN}$ decreases. In practice, the duration of time between from time B and C may be much longer than the other time intervals. Most of the voltage drop across the pinned photodiode $D_{PIN}$ will therefore happen between time B and C. The voltage across the pinned photodiode $D_{PIN}$ will be nearly flat between time C and D due to the timescale difference.

The readout phase starts at time C and ends shortly after time E. At time C, the COLRST signal is asserted to reset the input signal $V_{IN}$ at the floating diffusion FD. Vref may represent a voltage level that places the gain amplifier 515 into a high gain region so that small changes in the input signal $V_{IN}$ can be detected. For example, Vref may be the power supply voltage VDD or a different selected voltage level. At time D, the TX signal is pulsed to transfer charge carriers from the photodiode $D_{PIN}$ to the floating diffusion FD, which decreases the input signal $V_{IN}$ accordingly. The input signal change $\Delta V_{in[1]}$ may be small and is amplified to generate a larger output signal change $\Delta V_{out[1]}$ that is more easily measurable.

To measure the output signal change $\Delta V_{out1}$, the output signal $V_{OUT}$ is sampled with double correlated sampling. One sample S1 is taken before time D, which is before the charge carriers are transferred. This sample S1 represents the carriers in the floating diffusion which are not from the pinned photodiode. Another sample S2 is taken after time E, which is after the charge carriers are transferred from the pinned photodiode. The amount of change $\Delta V_{out[1]}$ is computed, for example, by subtracting sample S2 from sample S1. The output signal change $\Delta V_{out[1]}$ is compared to a threshold amount of change to generate a binary signal that indicates whether the threshold amount of light has been reached. Using double correlated sampling cancels out unwanted noise on the input signal $V_{IN}$ at the floating diffusion FD when it is reset to the reference voltage Vref level, resulting in a more accurate determination of whether the threshold amount of light has been detected by the IP.

The exposure and readout phases are repeated. Another exposure phase starts at time E and ends at time G. In practice, the duration of time between from time E and F may be much longer than the other time intervals. Most of the voltage drop across the pinned photodiode $D_{PIN}$ will therefore happen between time E and F. The voltage across the pinned photodiode $D_{PIN}$ will be nearly flat between time F and G due to the timescale difference.

Another readout phase starts at time F and ends shortly after time H. The COLRST signal is asserted at time F to reset the input signal $V_{IN}$ at the floating diffusion FD to the reference voltage Vref, thereby eliminating any residual charge left from the first exposure phase. At time G, the charge transfer signal TX is pulsed to transfer charge from the photodiode $D_{PIN}$ to the floating diffusion FD, which decreases the input signal $V_{IN}$ accordingly. The input signal change $\Delta V_{in[2]}$ is amplified to generate, in this example, a larger output signal change $\Delta V_{out[2]}$. Two samples S3 and S4 are taken and compared to determine the output signal change $\Delta V_{out[2]}$, which is then compared to the threshold amount of change.

The duration between the charge transfer signal TX pulses ($t_{int[1]}$, $t_{int[2]}$) can be scalable and programmable so that the response of the IP can be tuned by time duration. In other words, the resolution, sensitivity and/or dynamic range of the IP can be adjusted by varying the duration between the charge transfer signal TX pulses. Depending on the minimum signal level that can be resolved during readout, the time duration can be set to a length of time that is short enough so that the smallest detectable input voltage change LA/in defines the minimum quantization unit. Also, a programmable time duration provides another dimension of information (time) that can be used to form a time measured image sensor.

Figure 6B:
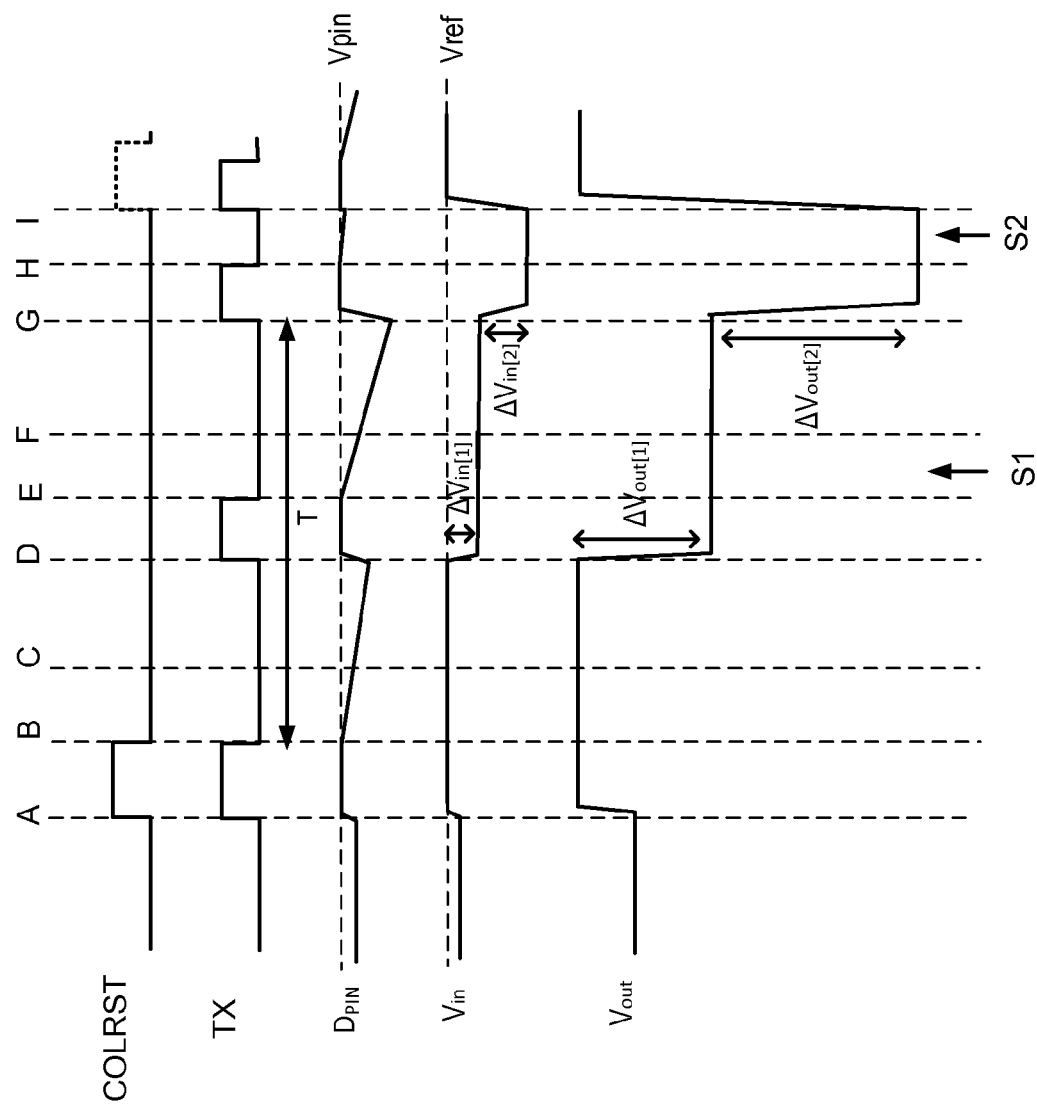
FIG. 6B is a timing diagram illustrating the operation of a pixel of FIG. 5 that does not use correlated double sampling, according to an embodiment.

FIG. 6B is a timing diagram illustrating the operation of the pixel of FIG. 5 in a way that does not use correlated double sampling, according to an embodiment. In FIG. 6B, the COLRST signal is not asserted to reset the input signal $V_{IN}$ every time the output signal $V_{OUT}$ is read out. Instead, the COLRST signal is only asserted after the threshold amount of light is detected by the IP. This allows the voltage changes to accumulate at the floating diffusion FD until the change is sufficient to indicate that the threshold amount of light is detected.

The initialization phase begins at time A and ends at time B. During initialization, the pinned photodiode structure 502 is reset by asserting both the COLRST and TX signals to set the input signal $V_{IN}$ at the floating diffusion FD and reset the voltage across the pinned photodiode $D_{PIN}$.

The first exposure phase beings at time B and ends at time D. At time B, the pinned photodiode $V_{PIN}$ begins integration of charge carriers. As the pinned photodiode $D_{PIN}$ is exposed to light, it collects charge carriers and the voltage across the pinned photodiode $D_{PIN}$ decreases.

The first readout phase starts at time D and ends shortly after time E. During the readout phase, the TX signal is asserted to transfer charge from the photodiode $D_{PIN}$ to the floating diffusion FD, which causes a corresponding change in the input signal $V_{IN}$. The input signal change $\Delta V_{in[1]}$ is amplified to generate a larger output signal change $\Delta V_{out[1]}$. After time E, when the charge has been transferred to the floating diffusion FD, the output signal $V_{OUT}$ is sampled to generate a sample S1. The sample S1 is compared to a threshold voltage level to generate a binary signal that indicates whether a threshold amount of light has been detected.

The exposure phases and readout phases repeat, aggregating charge at the floating diffusion FD, until the sampled voltage level crosses the threshold voltage level. In FIG. 6b, it is assumed that the first sample S1 does not cross the threshold voltage level. So a second exposure phase begins at time E and ends at time G to collect additional charge carriers at the pinned photodiode $D_{PIN}$. A second readout phase starts at time G and ends shortly after time H to transfer additional charge carriers to the floating diffusion FD. After time H, the output signal $V_{OUT}$ is sampled again to generate sample S2. Sample S2 is compared to the threshold voltage level to generate a binary signal that indicates whether the threshold amount of light has been detected.

Once the threshold voltage level is crossed and a sample has been taken, the IP is reset by asserting the COLRST signal to reset the input signal $V_{IN}$ at the floating diffusion to the reference voltage level Vref and concurrently asserting TX to reset the photodiode. In FIG. 6b, it is assumed that sample S2 crosses the threshold voltage level so the COLRST signal and TX signal are asserted at time I to reset the IP. On the other hand, if sample S2 did not cross the threshold, COLRST would not be asserted after time I. The total approximate exposure time is represented by time T.

If the incoming light signal is bright, the output voltage change $\Delta V_{OUT}$ may pass the threshold within a short time and it so may be preferred to use the correlated double sampling of FIG. 6a to minimize noise. However, if the incoming light signal is dim, the IP may need to integrate the light signal for a long period of time until the output voltage $V_{OUT}$ passes the threshold. In this case, due to the limitation of some image array readout algorithms (e.g. rolling shutter based operation), the direct sampling technique of FIG. 6b may be preferred even though it results in a higher noise level.

In one embodiment, the image sensor 100 supports both the correlated double sampling scheme of FIG. 6a and the direct sample scheme of FIG. 6b. The image sensor 100 may switch between the two sampling schemes as needed. In one mode of operation, samples are first taken according to FIG. 6a, with correlated double sampling. If the threshold has not been met, the charge is left on the floating diffusion FD and additional samples are taken using the non-destructive mode of FIG. 6b.

Figure 7:
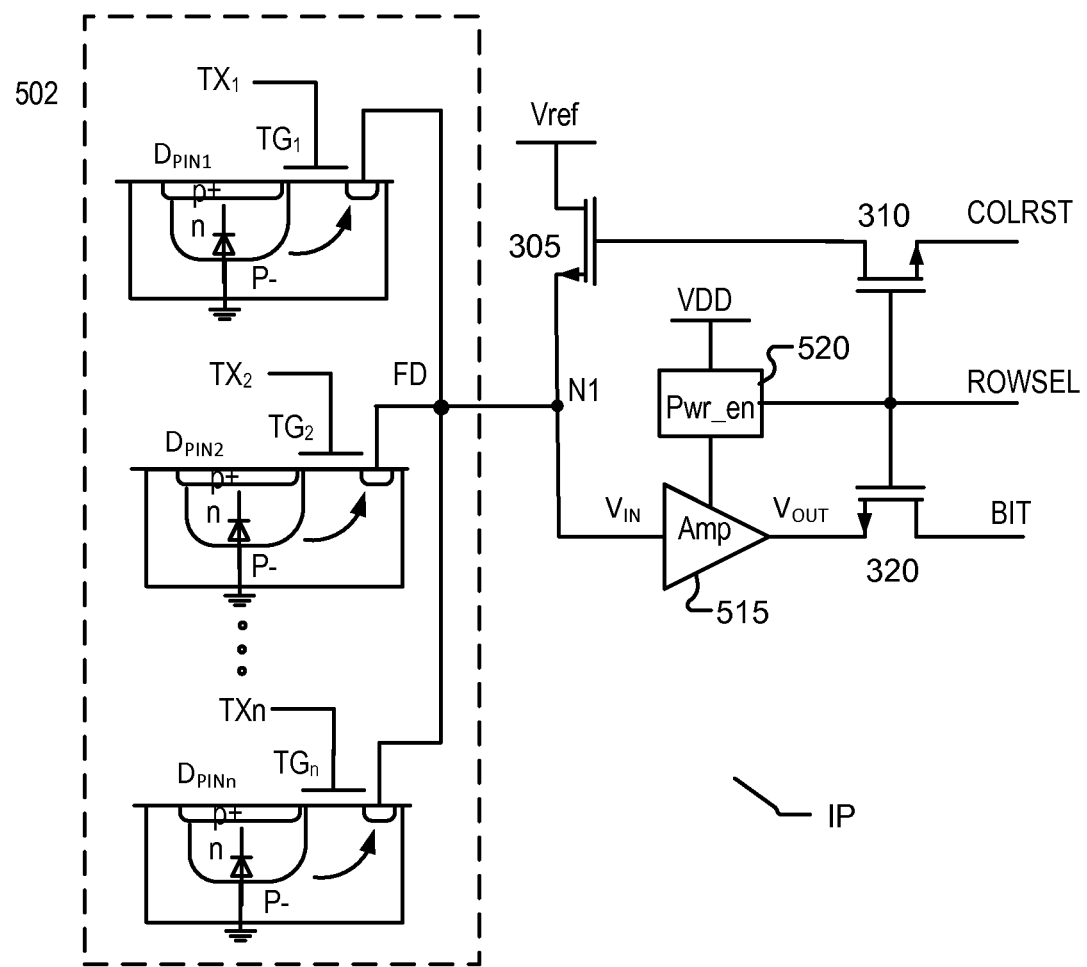
FIG. 7 is a circuit diagram of a pixel arrangement that includes multiple pinned photodiodes similar to FIG. 5 but that share some pixel circuitry, according to an embodiment.

FIG. 7 is a circuit diagram of a pixel circuit IP that shares an amplifier gain stage and a row/column specifiable reset system between multiple pinned photodiodes, according to an embodiment. The IP of FIG. 7 is similar to the IP of FIG. 5, but now the pinned photodiode structure 502 includes multiple pinned photodiodes $D_{PIN}$ and transfer gates TG that share a common floating diffusion FD. There may be a large number of pinned photodiodes $D_{PIN}$ sharing a common floating diffusion FD, reset switch 305, amplifier 515, reset gating switch 310, and access switch 520. Each transfer gate TG connected to the floating diffusion FD is independently controlled by its own TX signal, which in some embodiments may increase the total number of TX signals when compared to FIG. 4.

The IP of FIG. 7 can be operated in independent mode where each pinned photodiode $D_{PIN}$ is operated independently of the other pinned photodiodes $D_{PIN}$ as its own sub-pixel. In independent mode, the operation of the IP in FIG. 7 is similar to that shown in FIG. 6A, but reset-transfer-sampling sequences for each of the pinned photodiodes $D_{PIN1-n}$ is interleaved and repeated for each of the pinned photodiodes $D_{PIN-n}$ sharing the common floating diffusion FD. A different analog readout is produced on the bitline BIT for each pinned photodiode $D_{PIN}$. For example, first, the charge across $D_{PIN1}$ can be transferred onto the floating diffusion FD, amplified, and read out onto the bitline BIT. Then, the floating diffusion FD can be reset and the charge across $D_{PIN2}$ can be transferred onto the floating diffusion FD, amplified, and read out onto the bitline BIT. In this manner, a single pixel circuit IP with n number of pinned photodiodes $D_{PIN}$ can produce enough information for n sub pixels while sharing a reset switch 305, amplifier 515, reset gating switch 310, and access switch 520 to reduce the size of the pixel array 110.

In a binned mode of operation, the signals from multiple pinned photodiodes $D_{PIN}$ can be binned together to produce a single analog readout representing a single logical pixel. Charge carriers can be transferred from the pinned photodiodes $D_{PIN}$ to the floating diffusion FD in serial fashion, one photodiode $D_{PIN}$ at a time. For example, $TX_1$ can be pulsed to transfer charge from pinned photodiode $D_{PIN1}$ to the floating diffusion FD, then $TX_2$ can be pulsed to transfer charge carriers from pinned photodiode $D_{PIN2}$ to the floating diffusion FD. The aggregate change in the charge carriers stored on the floating diffusion FD is reflected in the input signal $V_{IN}$ and read out from the IP via the output signal $V_{OUT}$. The binned mode can operate using correlated double sampling according to FIG. 6A or without correlated double sampling according to 6B.

The use of multiple pinned photodiodes $D_{PIN}$ sharing common readout circuitry allows for smaller readout circuitry and makes binning possible in low light situations. For example, in low light situations, more pinned photodiodes $D_{PIN}$ can be grouped together to increase the light sensitivity of the IPs while sacrificing some spatial resolution, whereas in higher light situations, the IP can operate without binning to increase spatial resolution.

Figure 8:
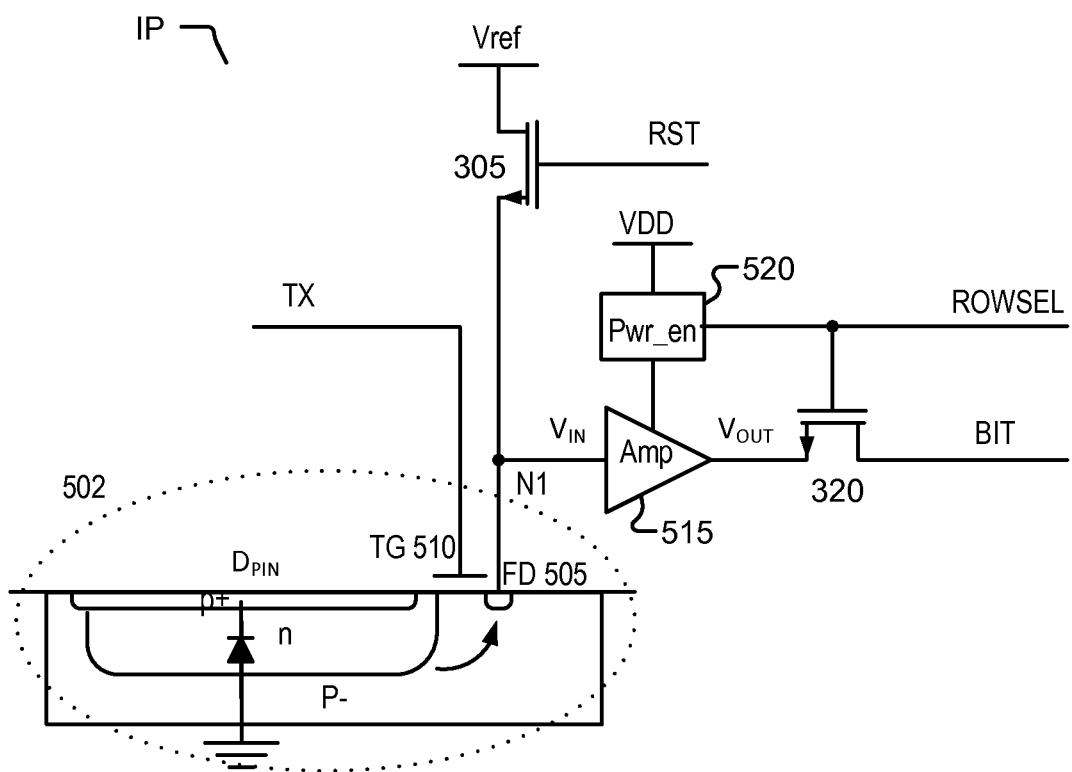
FIG. 8 is a circuit diagram of a pixel circuit IP that includes a pinned photodiode that is suitable for use as the pixel circuit IP from FIG. 4, according to another embodiment.

FIG. 8 is a circuit diagram of a pixel circuit IP that includes a pinned photodiode that is suitable for use as the pixel circuit IP from FIG. 4, according to another embodiment. The IP of FIG. 8 is similar to the IP from FIG. 5. However, the IP does not include the reset gating switch 310 of FIG. 5. Instead, the state of the reset switch 305 is now controlled directly by a reset signal RST. The reset signal RST may be the COLRST signal from FIG. 4. The reset signal RST may also be another signal, for example, a global reset signal or a reset signal dedicated specifically to that IP.

Figure 9:
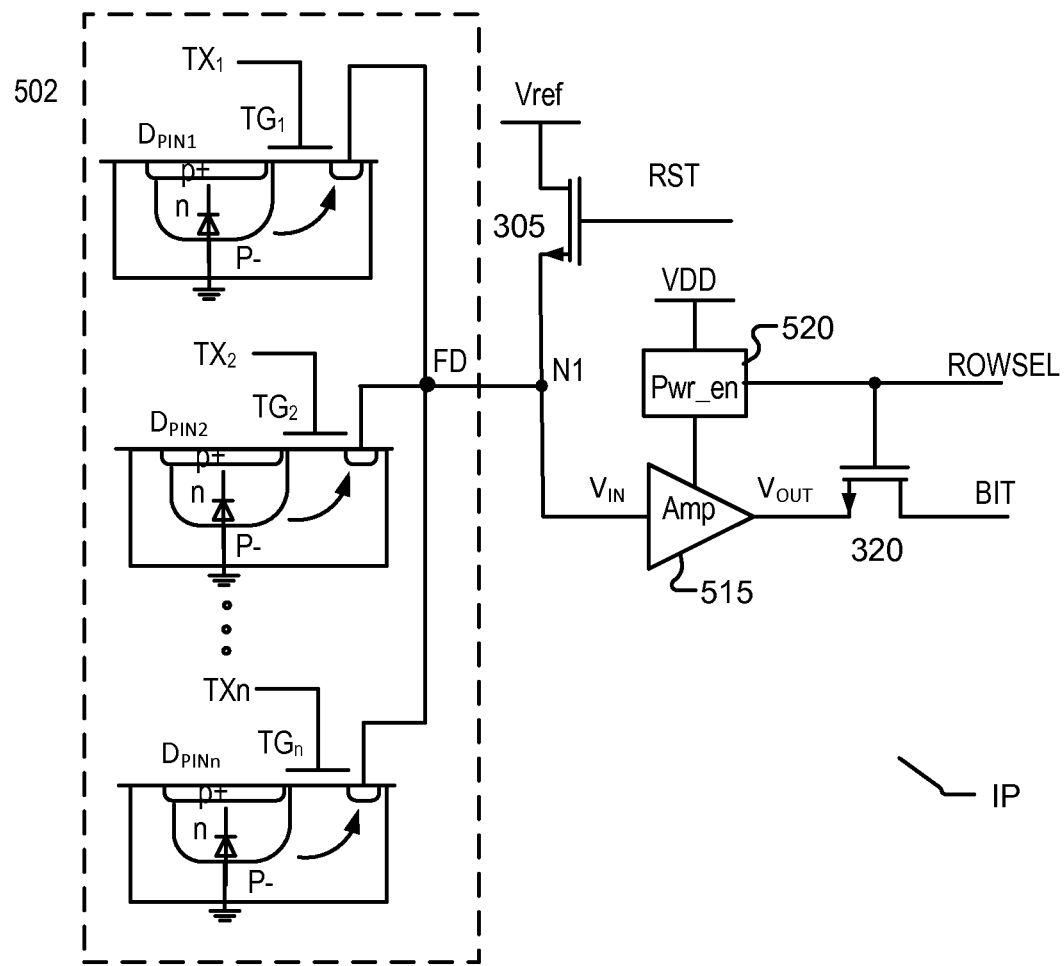
FIG. 9 is a circuit diagram of a pixel circuit IP that includes multiple pinned photodiodes that is suitable for use as the pixel circuit IP from FIG. 4, according to another embodiment.

FIG. 9 is a circuit diagram of a pixel circuit IP that shares an amplifier gain stage between multiple pinned photodiodes, and that is suitable for use as the pixel circuit IP from FIG. 4, according to another embodiment. The IP of FIG. 9 is similar to the IP from FIG. 7. However, the IP does not include the reset gating switch 310 of FIG. 7. Instead, the state of the reset switch 305 is now controlled directly by a reset signal RST. The reset signal RST may be the COLRST signal from FIG. 4. The reset signal RST may also be another signal, for example, a global reset signal or a reset signal dedicated specifically to that IP.

Figure 10:
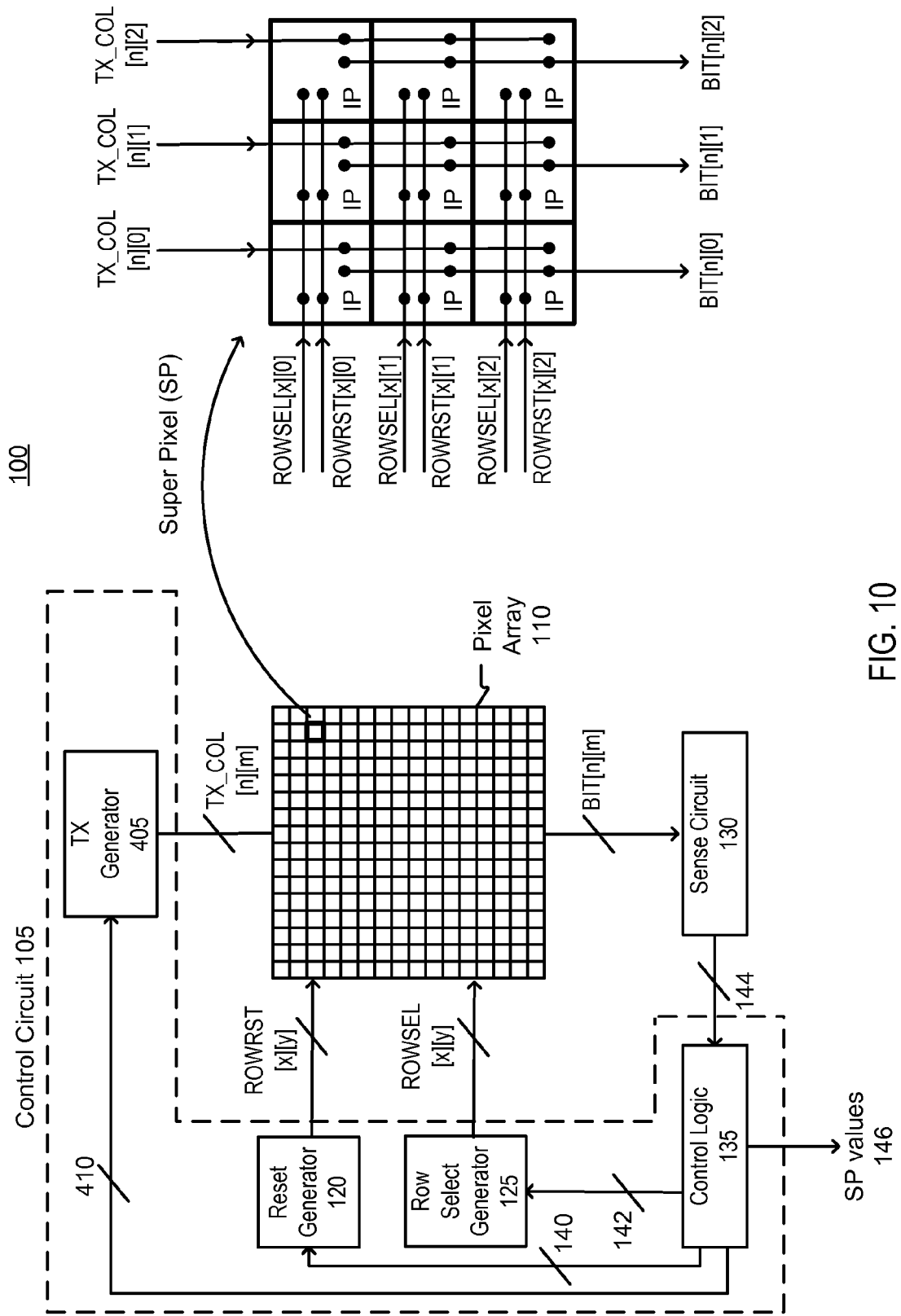
FIG. 10 is a diagram of an image sensor, according to yet another embodiment.

FIG. 10 is a diagram of an image sensor, according to yet another embodiment. FIG. 10 is similar to FIG. 4, but now the locations of the reset generator 120 and TX generator 405 are reversed. Reset generator 120 now generates row reset signals ROWRST for resetting signal nodes within the IPs. Each row of IPs is reset by a ROWRST signal of a ROWRST line, resulting in a total of [x][y] number of ROWRST lines. Each ROWRST signal resets an entire row (or partial row or rows) of IPs at a time when asserted. Control logic 135 controls the timing of the ROWRST signals output by reset generator 405 through control path 410

TX generator 405 now generates column-based charge transfer signals TX_COL for controlling charge transfer within pinned photodiode structures (not shown) of the IPs. The TX_COL signals are carried to the pixel array 110 via TX_COL lines. Each column of IPs is controlled by a different TX_COL line, resulting in a total of [n][m] number of TX_COL lines. Each TX_COL signal controls an entire column (or partial column or columns) of IPs at a time. Control logic 135 controls the timing of the TX_COL signals output by TX generator 405 through control path 410.

As shown in FIG. 10, the ROWSEL lines and TX_COL lines form a grid such that each IP is connected to both a ROWSEL line and a TX_COL line. In one embodiment, charge is transferred from a pinned photodiode (not shown) within an IP only if both the ROWSEL signal and the TX_COL signal connected to the IP are asserted. In any other situation, charge is not transferred. Because each intersection of ROWSEL and TX_COL lines is connected to a different IP, the control logic 135 can individually control charge transfer within one IP at a time. Alternatively, the control logic 135 can force charge transfer within one row of IPs at a time, within one column of IPs at a time, within contiguous or non-contiguous blocks of IPs served by the same set of ROWSEL and TX_COL lines, or within the entire pixel array 110 at once. Controlling charge transfer within the IPs of an image sensor 100 with a combination of ROWSEL and TX_COL lines enables better control over charge transfer without needing to add a dedicated TX_COL line for each IP.

Figure 11:
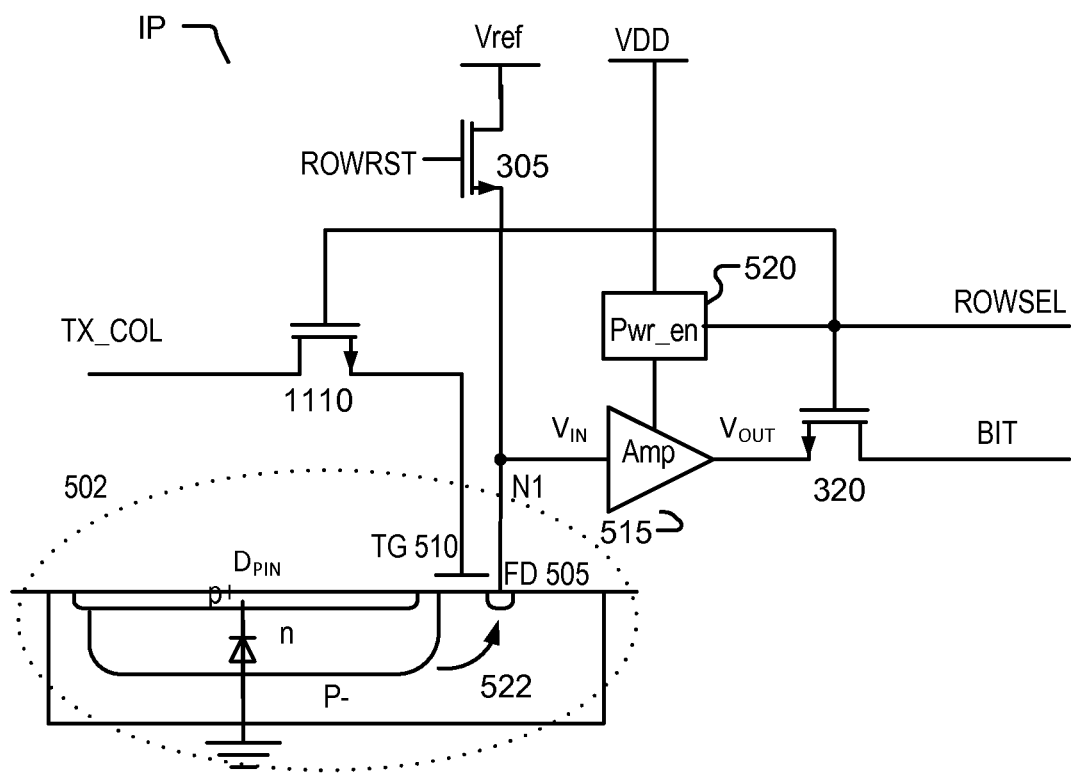
FIG. 11 is a circuit diagram of a pixel including a pinned photodiode structure that is suitable for use, e.g., as the pixels from FIG. 10, according to an embodiment.

FIG. 11 is a circuit diagram of a pixel including a pinned photodiode structure that is suitable for use, e.g., as the pixels from FIG. 10, according to an embodiment. The IP of FIG. 11 is similar to the IP of FIG. 5 but uses a row enabled charge transfer scheme instead of a row enabled reset scheme.

Specifically, the IP now includes a TX_COL gating switch 1110. TX_COL gating switch 1110 is coupled between the TX_COL line and the charge transfer gate TG 510. The state of the ROWSEL signal controls whether TX_COL gating switch 1110 is open or closed. When the ROWSEL signal is de-asserted, TX_COL gating switch 1110 is opened to float the charge transfer gate TG 510. This blocks the TX_COL signal and prevents it from reaching the charge transfer gate 510, which in turn prevents charge from being transferred from the pinned photodiode $D_{PIN}$ to the floating diffusion FD 505. On the other hand, when the ROWSEL signal is asserted, TX_COL gating switch 1110 is closed to pass the TX_COL signal to the charge transfer gate TG 510. The status of the TX_COL signal then controls whether charge transfer gate 510 transfer charge from the pinned photodiode $D_{PIN}$ to the floating diffusion FD 505 at node N1.

Additionally, reset switch 305 is coupled directly to the ROWRST line. When the ROWRST signal is asserted, reset switch 305 is closed and resets floating diffusion FD 505 at node N1 to the reference voltage Vref. When the ROWRST signal is de-asserted, reset switch 305 is open so that the input signal $V_{IN}$ is allowed to change as charge carriers are transferred to the floating diffusion FD at node N1.

Figure 12A:
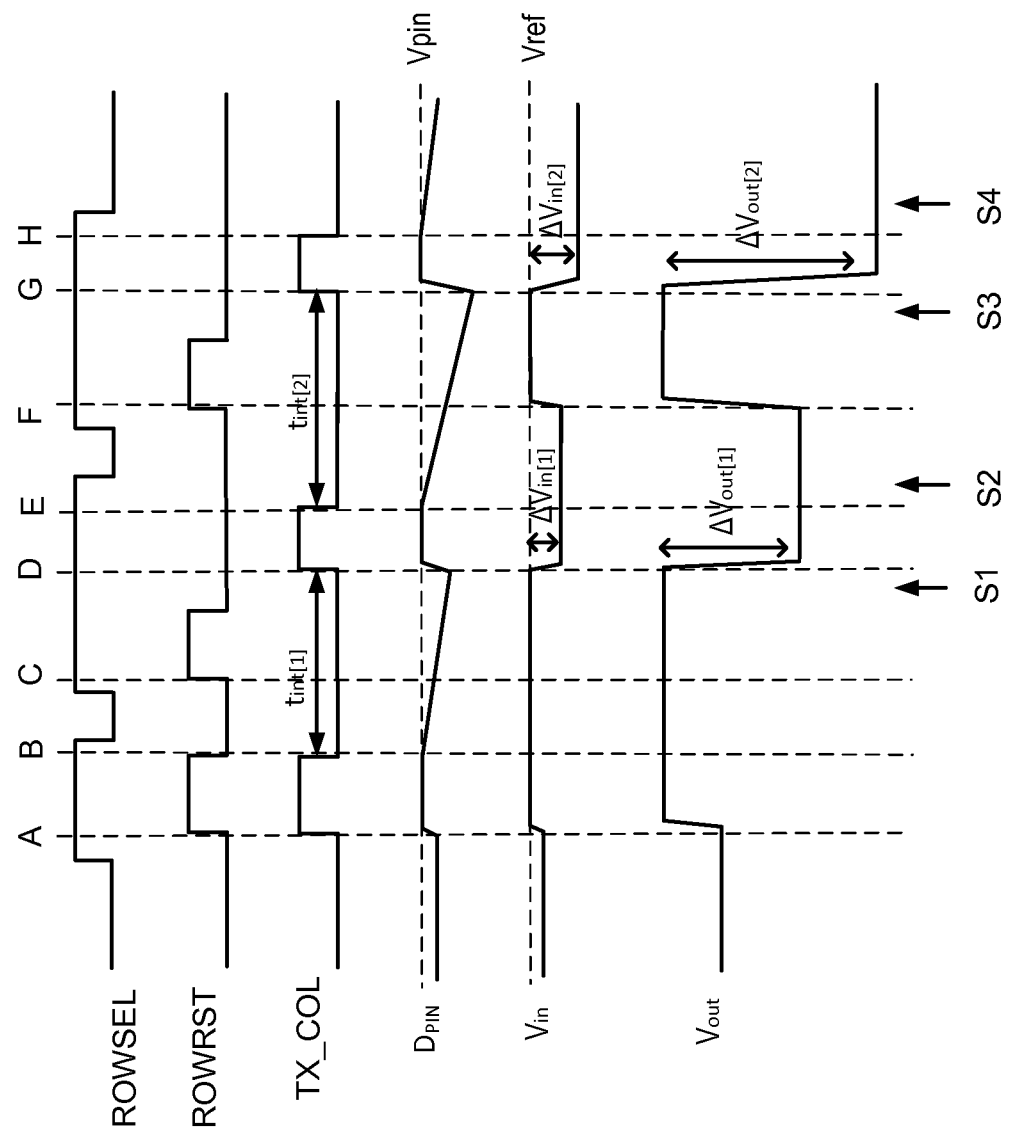
FIG. 12A is a timing diagram illustrating the operation of a pixel of FIG. 11 that uses correlated double sampling, according to an embodiment.
Figure 12B:
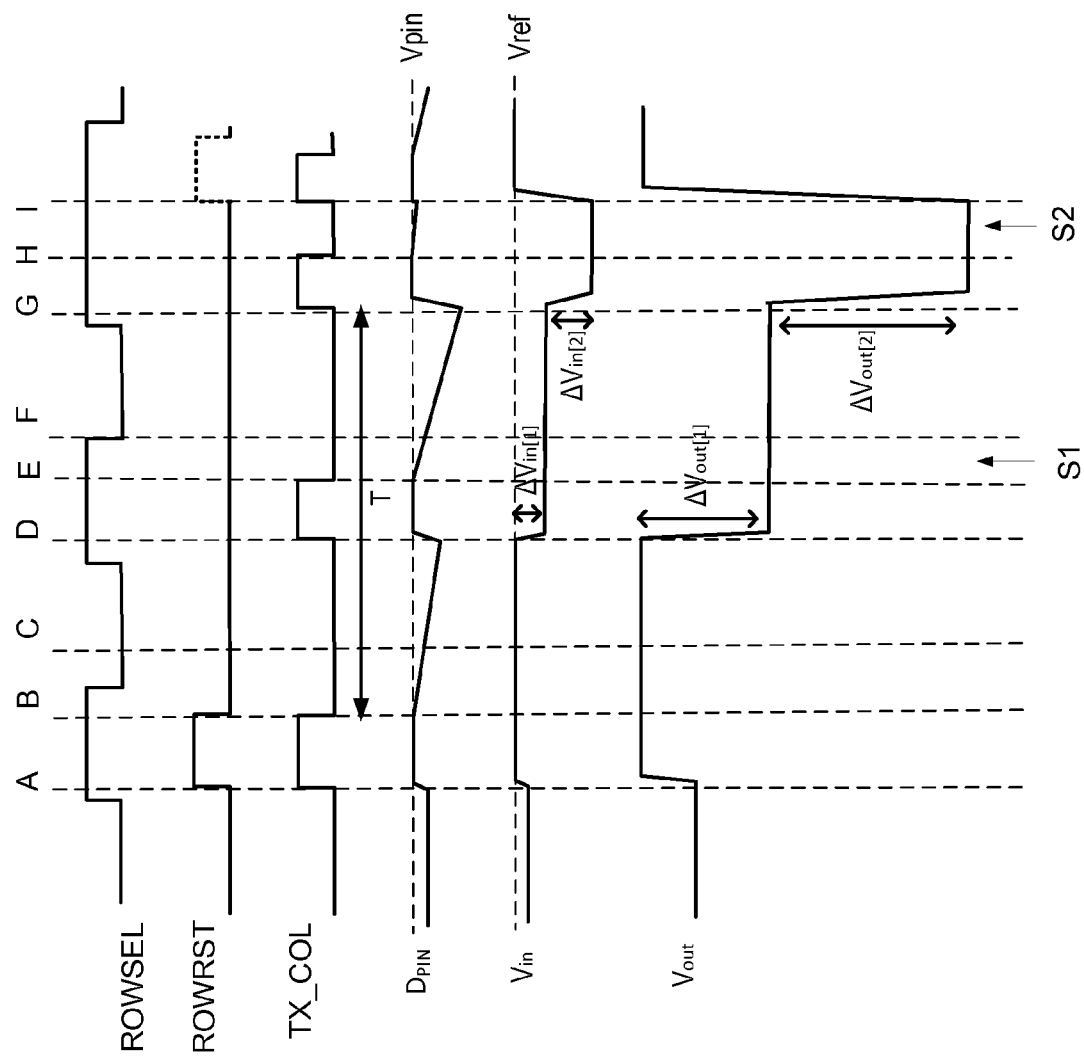
FIG. 12B is a timing diagram illustrating the operation of a pixel of FIG. 11 that does not use correlated double sampling, according to an embodiment.

FIG. 12A is a timing diagram illustrating the operation of a pixel of FIG. 11 that uses correlated double sampling, according to an embodiment. The timing diagram of FIG. 12B is similar to the timing diagram of FIG. 5a, but now includes timing information for the ROWSEL signal, ROWRST signal, and TX_COL signal. As previously mentioned, the timing diagrams of FIGS. 12A and 12B may not be to scale and are shown only for understanding of embodiments described herein.

The initialization phase begins at time A and ends at time B. During initialization, the pinned photodiode structure 502 is reset by asserting both the ROWRST, TX_COL, and ROWRST signals. This opens a path from Vref to the pinned photodiode $D_{PIN}$ and resets the input signal $V_{IN}$ at the floating diffusion FD to Vref. This also resets the voltage across the pinned photodiode $D_{PIN}$ to a pinned reset voltage level Vpin.

The exposure phase beings at time B and ends at time D. At time B, the pinned photodiode $V_{PIN}$ is disconnected from the floating diffusion FD due to the de-assertion of the TX_COL signal. As the pinned photodiode $D_{PIN}$ is exposed to light, it collects charge carriers and the voltage across the pinned photodiode $D_{PIN}$ decreases. ROWSEL is also de-asserted between time B and time C. This allows the TX_COL to be used for controlling IPs in other rows without affecting the state of the IP of the current row. Thus, TX_COL may have several transitions between time B and time C that are not shown in FIG. 12A. In practice, the duration of time between time B and C may be much longer than the duration of time between time C and D. Therefore most of the voltage drop across the pinned photodiode $D_{PIN}$ will happen between time B and C.

The readout phase starts at time C and ends shortly after time E. At time C, the ROWRST signal and ROWSEL signals are asserted. The assertion of the ROWRST signal resets the input signal $V_{IN}$ at the floating diffusion FD. At time D, the TX_COL signal is pulsed to transfer charge carriers from the photodiode $D_{PIN}$ to the floating diffusion FD, which decreases the input signal $V_{IN}$ accordingly. The input signal change $\Delta V_{in[1]}$ may be small and is amplified to generate a larger output signal change $\Delta V_{out[1]}$ that is more easily measurable.

To measure the output signal change $\Delta V_{out1}$, the output signal $V_{OUT}$ is sampled with correlated double sampling. One sample S1 is taken before time D, which is before the charge carriers are transferred. Another sample S2 is taken after time E, which is after the charge carriers are transferred from the pinned photodiode. Note that ROWSEL is also asserted during the time when samples S1 and samples S2 are taken because the ROWSEL signal controls the access transistor 320.

The exposure and readout phases are repeated. Another exposure phase starts at time E and ends at time G. In practice, the duration of time between time E and F may be much longer than the duration of time between time F and G such that most of the voltage drop across the pinned photodiode $D_{PIN}$ happens between time E and F. Another readout phase starts at time F and ends shortly after time H.

FIG. 12B is a timing diagram illustrating the operation of a pixel of FIG. 11 that does not use correlated double sampling, according to an embodiment. The timing diagram of FIG. 12B is similar to the timing diagram of FIG. 5B, but now includes timing information for the ROWSEL signal, ROWRST signal, and TX_COL signal.

The initialization phase begins at time A and ends at time B. During initialization, the pinned photodiode structure 502 is reset by asserting the ROWSEL, ROWRST, and TX_COL signals to reset the input signal $V_{IN}$ at the floating diffusion FD and reset the voltage across the pinned photodiode $D_{PIN}$.

The first exposure phase beings at time B and ends at time D. At time B, the pinned photodiode $V_{PIN}$ begins integration of charge carriers. As the pinned photodiode $D_{PIN}$ is exposed to light, it collects charge carriers and the voltage across the pinned photodiode $D_{PIN}$ decreases. ROWSEL is also de-asserted after time B. This allows the TX_COL to be used for controlling IPs in other rows without affecting the operation of the IP of the current row. Thus, TX_COL may have several transitions between time B and time D that are not shown in FIG. 12B.

The first readout phase starts at time D and ends shortly after time E. During the readout phase, the ROWSEL signal is asserted and the TX_COL signal is pulsed to transfer charge from the photodiode $D_{PIN}$ to the floating diffusion FD, which causes a corresponding change in the input signal $V_{IN}$. The input signal change $\Delta V_{in[1]}$ is amplified to generate a larger output signal change $\Delta V_{out[1]}$. After time E, when the charge has been transferred to the floating diffusion FD, the output signal $V_{OUT}$ is sampled to generate a sample S1. The sample S1 is compared to a threshold voltage level to generate a binary signal that indicates whether a threshold amount of light has been detected.

The exposure phases and readout phases repeat, aggregating charge at the floating diffusion FD, until the sampled voltage level crosses the threshold voltage level. In FIG. 12B, it is assumed that the first sample S1 does not cross the threshold voltage level. So a second exposure phase begins at time E and ends at time G to collect additional charge carriers at the pinned photodiode $D_{PIN}$. ROWSEL is de-asserted between time F and G, which allows the TX_COL signal to be used for controlling IPs in other rows without affecting the operation of the IP of the current row.

A second readout phase starts at time G and ends shortly after time H to transfer additional charge carriers to the floating diffusion FD. After time H, the output signal $V_{OUT}$ is sampled again to generate sample S2. Sample S2 is compared to the threshold voltage level to generate a binary signal that indicates whether the threshold amount of light has been detected. Alternatively, sample S2 can be used to generate a multi-bit signal representing a detected amount of light.

Figure 13:
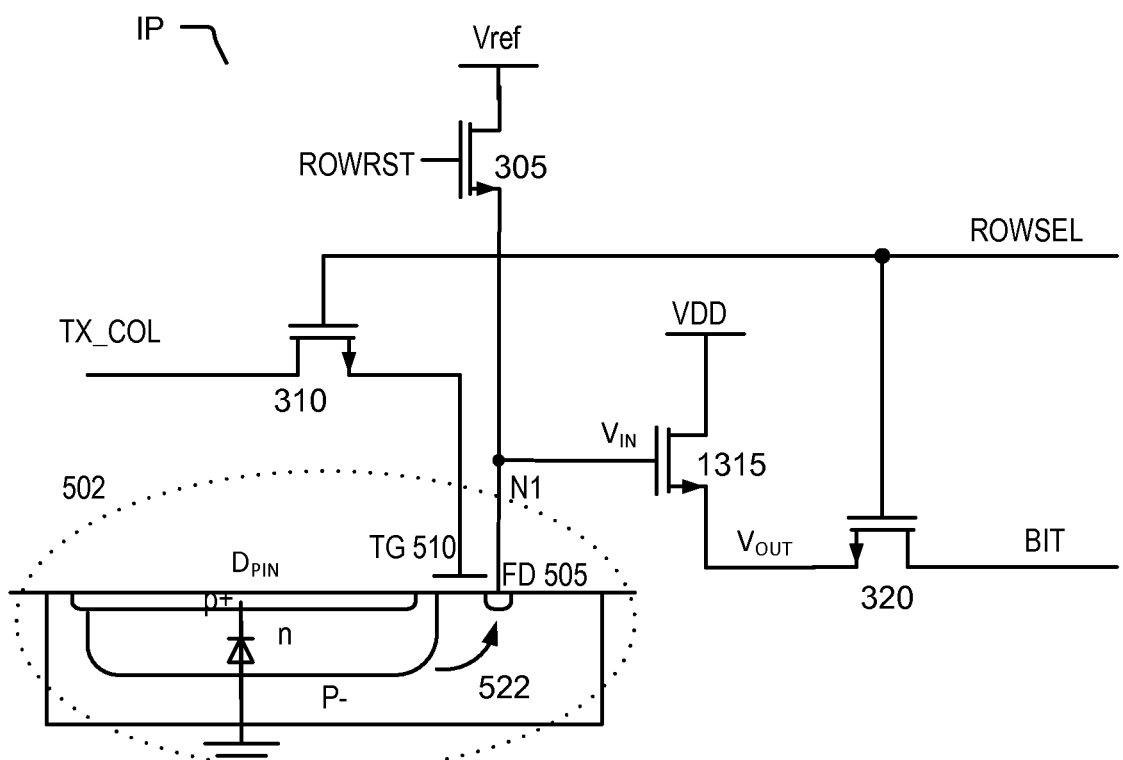
FIG. 13 is a circuit diagram of a pixel including a pinned photodiode structure that is suitable for use, e.g., as the pixels from FIG. 10, according to another embodiment.

FIG. 13 is a circuit diagram of a pixel including a pinned photodiode structure that is suitable for use, e.g., as the pixels from FIG. 10, according to another embodiment. The IP of FIG. 13 is similar to the IP of FIG. 11, but now the amplification stage of the IP includes a transistor 1315 configured as a source-follower amplifier. The drain of the transistor 1315 is coupled to VDD, a gate of the transistor 1315 is coupled the floating diffusion FD 505 at node N1, and the source of the transistor 1315 is coupled to the access switch 320. The transistor 1315 amplifies changes in the input signal $V_{in}$ in order to generate amplified changes in the output signal $V_{out}$.

Figure 14:
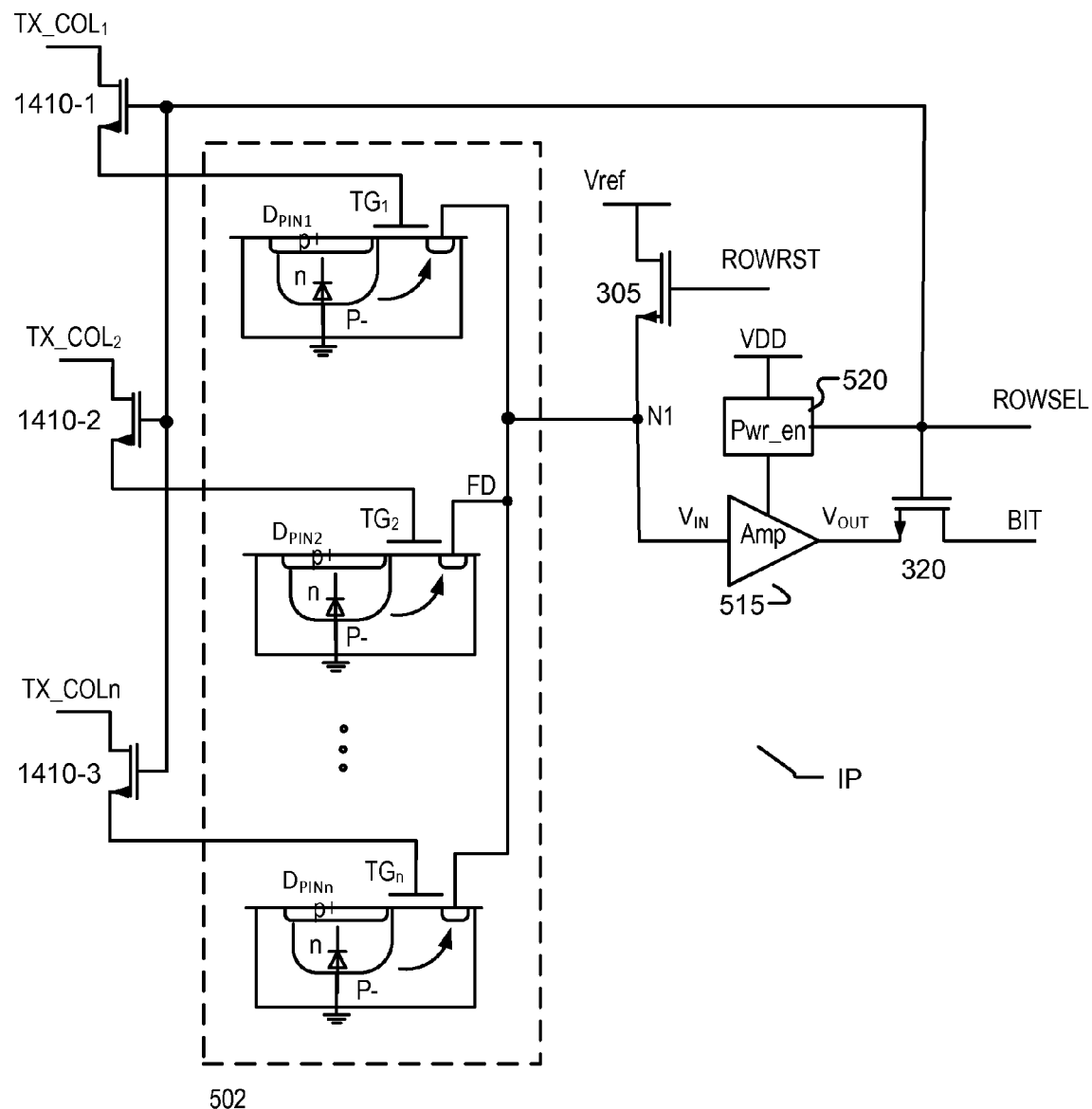
FIG. 14 is a circuit diagram of a pixel circuit IP that includes multiple pinned photodiodes that is suitable for use as the pixel circuit IP from FIG. 10, according to yet another embodiment.

FIG. 14 is a circuit diagram of a pixel circuit IP including multiple pinned photodiodes that is suitable for use as the pixel circuit IP from FIG. 10, according to yet another embodiment. The IP of FIG. 14 is similar to the IP of FIG. 11, but now includes multiple pinned photodiodes $D_{PIN}$ and transfer gates TG that share a common floating diffusion FD (which is similar in concept to the IP of FIG. 7). There may be a large number of pinned photodiodes $D_{PIN}$ sharing a common floating diffusion FD, reset switch 305, amplifier 515, and access switch 320. Each transfer gate TG is independently controlled by its own TX_COL signal, which in some embodiments may increase the total number of TX_COL signals when compared to FIG. 10. There are also several TX_COL gating switches 1410-1, 1410-2, and 1410-3. Each TX_COL gating switch 1410 passes or does not pass a respective charge transfer signal TX_COL to a respective charge transfer gate TG based on the state of the ROWSEL signal.

Like the IP of FIG. 7, the IP of FIG. 7 can be operated in independent mode where each pinned photodiode $D_{PIN}$ is operated independently of the other pinned photodiodes $D_{PIN}$ as its own sub-pixel. Alternatively the IP can be operated in binned mode where the signals from multiple pinned photodiodes $D_{PIN}$ are binned together to produce a single analog output signal $V_{out}$ that represents a collective amount of charge across all of the pinned photodiodes $D_{PIN}$.

In one embodiment, the circuitry shown in FIG. 14 is considered to be a bundle of several different IPs. Each IP includes a unique TX_COL gating switch 1410, pinned photodiode $D_{PIN}$, and transfer gate TG. The IPs collectively share a reset switch 305, amplifier 515, power enable 520 circuitry, and access transistor 320.

Upon reading this disclosure, those of skill in the art may appreciate still additional alternative designs for an image sensor that includes conditional reset and pinned photodiode pixel circuits. For instance, various embodiments are shown with and without floating diffusion nodes, and various embodiments are shown with source follower or with higher gain charge conversion circuits—other embodiments exist which mix these elements in other configurations. Thus, while particular embodiments and applications of the present disclosure have been illustrated and described, it is to be understood that the disclosure is not limited to the precise construction and components disclosed herein. Various modifications, changes and variations which may be apparent to those skilled in the art may be made in the arrangement, operation and details of the method and apparatus of the present disclosure herein without departing from the spirit and scope of the disclosure as defined in the appended claims.

What is claimed is:

1. A pixel circuit of an image sensor, comprising:
   at least one photodetecting section;
   a signal node coupled to the at least one photodetecting section;
   a reset element to reset the signal node; and
   a row-enabled switch to pass or not pass, depending on a state of a row signal, a column reset signal to the reset element.

2. The pixel circuit of claim 1, wherein the at least one photodetecting section comprises a photodiode, and wherein the signal node is electrically connected to the photodiode.

3. The pixel circuit of claim 1, wherein the signal node comprises a floating diffusion and the at least one photodetecting section comprises a first pinned photodiode and a first charge transfer gate coupled between the first pinned photodiode and the floating diffusion.

4. The pixel circuit of claim 3, wherein the at least one photodetecting section comprises a second pinned photodiode and a second charge transfer gate coupled between the second pinned photodiode and the floating diffusion, wherein the first and second charge transfer gates are operated by respective and separate charge transfer signals.

5. The pixel circuit of claim 1, wherein the reset element is coupled between a reference voltage and the signal node and resets the signal node by resetting a voltage of the signal node based on the reference voltage.

6. The pixel circuit of claim 1, further comprising
   an output stage having an input coupled to the signal node and generating an output signal responsive to a voltage of the signal node.

7. The pixel circuit of claim 1, wherein the reset element and the row-enabled switch are transistors.

8. The pixel circuit of claim 1,
   wherein the at least one photodetecting section, the signal node, the reset element, and the row-enabled switch are all in a same pixel, and
   wherein the row enabled switch receives the column reset signal via a column line that is connected to a pixel column of a pixel array, and receives the row signal via a row line that is connected to a pixel row of the pixel array,
   wherein the reset element resets the signal node responsive to the column reset signal passed to the reset element from the row enabled switch.

9. An integrated-circuit image sensor comprising:
   row lines and column lines;
   a control circuit to generate row signals for the row lines and column reset signals for the column lines; and
   an array of pixel circuits each served by a respective one of the row lines and a respective one of the column lines, each pixel circuit comprising a reset element and a row-enabled switch to either pass or not pass, depending on a state of a corresponding row signal on the respective row line, a corresponding column reset signal on the respective column line to the reset element.

10. The sensor of claim 9, wherein the control circuit generates the row signals and the column reset signals to concurrently reset only a plurality of the pixel circuits served by a selected one of the row lines by asserting a single one of the row signals on the selected row line and concurrently asserting a plurality of the column reset signals.

11. The sensor of claim 9, wherein the control circuit generates the row signals and the column signals to concurrently reset only a plurality of the pixel circuits served by a selected one of the column lines by asserting a single one of the column signals on the selected column line and concurrently asserting a plurality of the row signals.

12. The sensor of claim 9, wherein the control circuit generates the row signals and the column signals to reset only a single pixel circuit of the array by asserting a single one of the row signals on a selected one of the row lines serving the single pixel circuit and concurrently asserting a single one of the column signals on a selected one of the column lines serving the single pixel circuit.

13. The sensor of claim 9, wherein the control circuit concurrently resets all of the pixel circuits in the array by asserting all of the row signals and concurrently asserting all of the column reset signals.

14. A pixel circuit of an image sensor, comprising:
    a first photodetector;
    a signal node;
    a first charge transfer gate coupled between the first photodetector and the signal node to transfer charge carriers between the first photodetector and the signal node responsive to a first charge transfer signal; and
    a first row-enabled switch to pass or not pass, depending on a state of a row signal, the first charge transfer signal to the first charge transfer gate.

15. The pixel circuit of claim 14, wherein the first photodetector is a pinned photodiode and the signal node is a floating diffusion.

16. The pixel circuit of claim 14, further comprising:
- a second photodetector;
- a second charge transfer gate coupled between the second photodetector and the signal node to transfer charge carriers between the second photodetector and the signal node responsive to a second charge transfer signal; and
- a second row-enabled switch to pass or not pass, depending on a state of the row signal, the second charge transfer signal to the second charge transfer gate.

17. The pixel circuit of claim 14, further comprising a reset element to reset the signal node.

18. The pixel circuit of claim 17, wherein the reset element is coupled between a reference voltage and the signal node and resets the signal node by resetting a voltage of the signal node based on the reference voltage.

19. The pixel circuit of claim 14, further comprising an amplifier section having an input coupled to the signal node, the amplifier section amplifying changes in a signal node voltage caused by the transferred charge carriers to generate amplified changes in an output signal.

20. The pixel circuit of claim 14,
wherein the first photodetector, the signal node, the first charge transfer gate, and the row-enabled switch are all in a same pixel, and
wherein the row enabled switch receives the first charge transfer signal via a column line that is connected to a pixel column of a pixel array, and receives the row signal via a row line that is connected to a pixel row of the pixel array,
wherein the first charge transfer gate transfers the charge carriers between the first photodetector and the signal node responsive to the first charge transfer signal passed to the first charge transfer gate from the row enabled switch.

\* \* \* \* \*